United States Patent [19]
DuBois

[11] Patent Number: 5,181,337
[45] Date of Patent: Jan. 26, 1993

[54] ESCAPE PROOF FISH HOOK CONNECTOR

[76] Inventor: Edward J. DuBois, 6501 Alicia Pl., Grand Rapids, Minn. 55744

[21] Appl. No.: 838,587

[22] Filed: Feb. 18, 1992

[51] Int. Cl.$^5$ .............................................. A01K 91/04
[52] U.S. Cl. .................... 43/44.83; 24/598.5
[58] Field of Search ............... 43/44.83, 42.49, 44.84, 43/44.85, 43.15, 42.23, 42.08; 24/598.5, 598.6, 601.5, 599.9

[56] References Cited

U.S. PATENT DOCUMENTS

| | | | |
|---|---|---|---|
| 2,181,317 | 11/1939 | Fernstrom | 43/44.83 |
| 2,211,273 | 8/1940 | Kleckner | 24/598.5 |
| 2,430,115 | 11/1947 | Hickson | 43/44.84 |
| 2,554,303 | 5/1951 | Longhenrich | 24/599.9 |
| 2,830,400 | 4/1958 | Perry | 24/598.5 |
| 2,840,898 | 7/1958 | Yeo | 24/598.6 |
| 3,696,547 | 10/1972 | Cauquis | 43/44.83 |
| 4,315,352 | 2/1982 | Wagner | 24/598.5 |

FOREIGN PATENT DOCUMENTS 387012  6/1908  France .............................. 24/598.5

Primary Examiner—Richard K. Seidel
Assistant Examiner—Chuck Y. Mah
Attorney, Agent, or Firm—Jerold M. Forsberg

[57] ABSTRACT

A device for the quick connection and disconnection of a fish hook to the end of a fishing line includes a sister hook arrangement. The device is extraordinarily strong for its size and weight providing a significant advantage over known arrangements. The sister hook arrangement can be connected directly to a swivel which in turn is tied directly to the end of the fishing line or can be part of a fishing leader which would also include a swivel. The sister hook arrangement includes mirror image sister elements pivotally attached to one another such they can be spread to an open position for the engagement of an attachment loop of a fish hook thereon and pivoted to a closed position to fixedly secure the fish hook relative thereto.

17 Claims, 1 Drawing Sheet

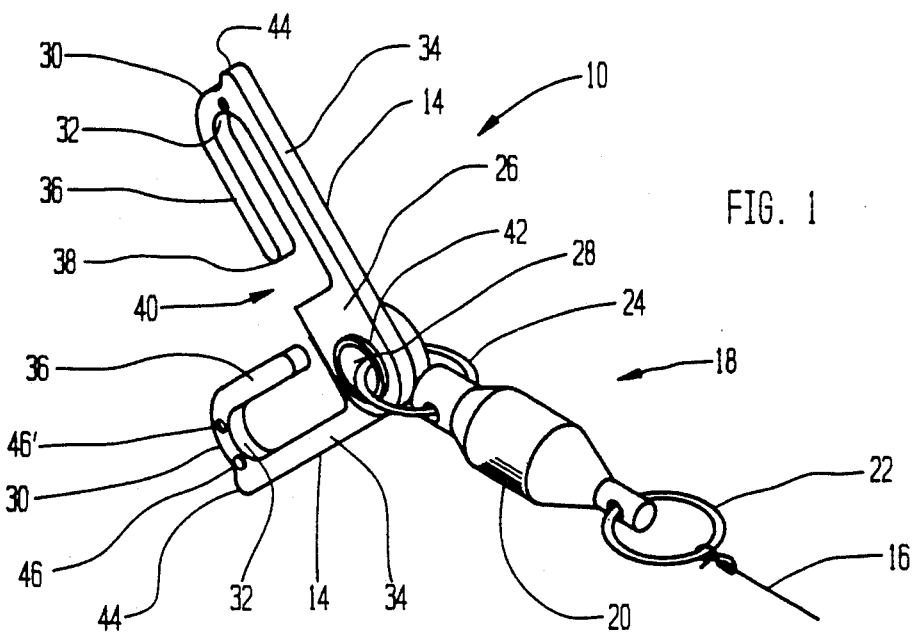
FIG. 1
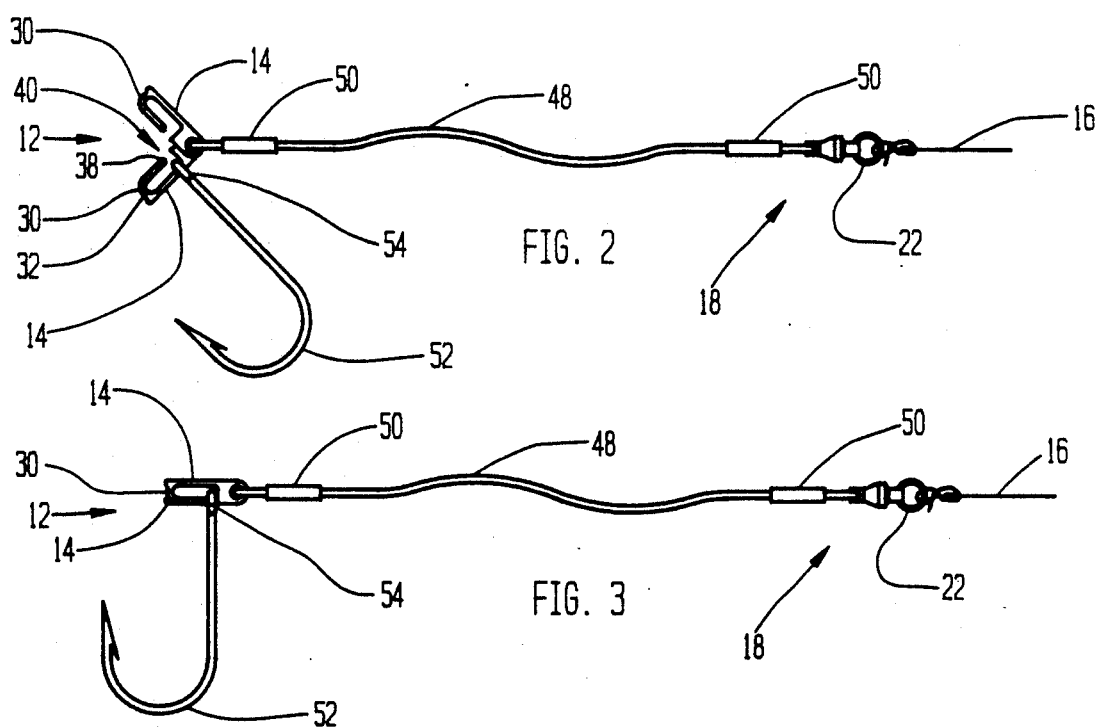
FIG. 2
FIG. 3
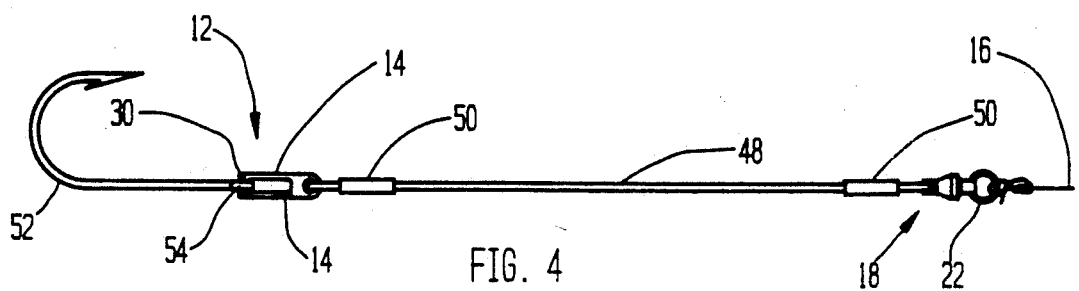
FIG. 4

ESCAPE PROOF FISH HOOK CONNECTOR

BACKGROUND OF THE INVENTION

The present invention relates generally to a small yet extraordinarily strong connector device for the quick connection and disconnection of a fish hook means and a fishing line.

Fisherman frequently change baits until they find a particular bait which will attract the species of fish for which they are fishing, e.g., contestants in tournament fishing contests often want to quickly change bait. Accordingly, facilitating the quick changing of a fish hook on the end of a fishing line has been found to be desirable. While quick release connector devices for connection and disconnection of fish hooks and baits are generally well known, there are no devices available which are small, light weight, and extremely strong, i.e., capable of withstanding heavy stresses which are transmitted through the fish hook to the connector device. Currently available connector devices deal with the problem of strength by increasing size, and when larger amounts of stress are anticipated the size and weight of these devices can be substantial.

As every fisherman knows, a fish hook may be engaged by fish but also may engage under water obstacles and become snagged. Large fish and snags can cause extra heavy stress to be transmitted through the fish hook to the connector device and the fishing line which often causes the connector device to break. While tremendous improvements in fishing line have been made in the last few years, including improvements in strength and resiliency, there have been no significant improvements in quick release connector devices. All of the most popular connector devices being marketed still use wire as a component. One example of a wire-type quick release connector device, marketed by Sampo Corp., is called the "CoastLock Snap". Another wire-type quick release connector device, marketed by Berkley Corp., is referred to as the "Cross-Lok". Yet another wire-type quick release connector device, marketed by Frabill, Inc., is simply referred to as a "Safety Snap". These connector devices are recognized as the standards in the industry and in order to have sufficient strength, e.g , when used for large species of fish, they must be increased in size which results in a substantial increase in weight. Size and weight are important factors in fishing situations and too much of either can be undesirable, particularly when floating type baits are used.

The market for fishing tackle is substantial and technical advancements and new improvements in fishing equipment in general, including baits, rods, reels, etc., are continually being developed. Research has confirmed that the instant invention should find immediate success in the market place due to its extraordinary strength in relation to its small size. There is a market, then, for a connector device, small in size, light weight, and extremely strong, which is capable of permitting the rapid interchanging of fish hooks and baits, especially if such a device is simple in construction and easy to use.

SUMMARY OF THE INVENTION

It is the primary purpose and principle object of the present invention to provide a connector device for the quick connection and disconnection of a fish hook to the end of a fishing line which is very small and light weight while being extraordinarily strong and easy to use.

The present invention involves a new use for a sister hook arrangement, the design for which is generally well known. Sister hook arrangements have been used in conjunction with chains and ropes and as clasps for jewelry. However, to the best of my knowledge, no one has ever used a sister hook arrangement as a connector device for the quick connection and disconnection of fish hook means to a fishing line. The sister hook arrangement of the instant invention can be easily opened for the engagement of a fish hook means thereon, e.g., a plain fish hook or an artificial bait, and when closed, and the fish hook is shifted to the distal end of the connector device, the fish hook is securely attached and is precluded from disengagement from the sister hook arrangement. The use of a connector device of the sister hook configuration, for the attachment of a fish hook to a fishing line, has never been done in the manner shown herein and, accordingly, provides a connector device which is substantially smaller and substantially stronger than the prior art fish hook connector devices, and is considered to be a significant advancement in the art.

Accordingly, it is a also an object of this invention to provide a method for the quick connection and disconnection of a fish hook to a fishing line.

These and other objects and advantages of the present invention will be apparent and understood from the following detailed description when taken in conjunction with the accompanying drawings.

BRIEF DESCRIPTION OF THE DRAWINGS

A device for the quick connection and disconnection of a fish hook means to an end of a fishing line, constructed in accordance with the principles of this invention, is described hereinbelow with reference to the accompanying drawing, wherein:

FIG. 1 is a perspective view of a connector device, according to the instant invention, coupled to a swivel which in turn is tied to the end of a fishing line;

FIG. 2 is a plan view showing a fishing leader with a connector device, as depicted in FIG. 1, connected to the end of a fishing line with the connector device shown in an open position and a fish hook engaged on a portion thereof;

FIG. 3 is a view similar to FIG. 2 showing the fish hook in a position permitting pivoting of the sister elements of the connector device, the connector device being shown in a closed position; and FIG. 4 is a view similar to FIGS. 2 and 3 with the fish hook shown in a ready for use position wherein opening of the connector device is prevented.

DETAILED DESCRIPTION OF THE INVENTION

It should be noted that like reference numerals are used throughout the various views to designate similar elements or components.

Referring now to FIG. 1, there is shown a connector device 10 according to the invention. Connector device 10 includes a sister hook arrangement 12 having a pair of sister elements 14 attached to an end of a fishing line 16 by a swivel 18. Swivel 18 includes a swivel body 20 for containing a swivel mechanism (not shown in detail), a welded ring 22 received through a bore in body 20 to which the end of the fishing line 16 is tied, and a welded ring 24 received through a bore at the other end of the swivel 18 such that welded ring 24 is freely rotatable relative to the end of the fishing line 16. Welded ring 24 is attached to the sister hook arrangement 12 in a manner discussed in detail later.

Sister elements 14 are mirror images of one another and generally have the same configuration. Accordingly, reference will be made in detail to only one with it being understood that the description is the same for both. Sister element 14 includes a first end 26 having an aperture 28 therethrough and a u-shaped hook end 30 having a bight portion 32 connected to first end 26 by a reach leg 34 and a short leg 36 having a free end 38. Short leg 38 defines, along with the first end 26, an access opening 40 which is the entrance to the u-shaped hook end 30. Sister elements 14 are pivotally attached to one another, as depicted in FIG. 1, by hollow rivet 42 extending through aligned apertures 28 and include extensions 44 to facilitate engagement by the user's fingers or finger nails to cause pivoting of the sister elements 14 relative to one another about the hollow rivet 42. Complementary detents 46 and 46', on each of the sister elements, cooperate when the sister elements are generally in alignment to resiliently retain the sister elements relative to one another. As best seen in FIG. 1, swivel 18 can be directly attached to the connector device 10 by welded ring 24 extending through hollow rivet 42 thereby permitting the connector device 10 to freely rotate relative to the end of fishing line 16. It should be noted that welded rings are preferred because of their strength, however, alternatives such as split rings could also be used.

Referring now to FIGS. 2–4 in greater detail, connector device 10 can be spaced from swivel 18 by a length of leader material 48 of any desired length. The preferred way of attaching the leader material 48 to welded ring 24 and sister hook arrangement 4 is to loop the ends of the leader material through welded ring 24 and through hollow rivet 42, respectively, and secure them in each respective loop with a ferrule 50. The leader material can be of any of a number of different commercially available materials including multi-strand coated wire, braided materials, and single strand stainless steel wire.

The connection of a fish hook 52 to the end of fishing line 16 is accomplished in the following manner. Sister elements 14 are pivoted about hollow rivet 42 to the open position, as shown in FIG. 2, and then loop 54 on fish hook 52 is engaged over the end of short leg 36 of one of the sister elements and slid around the u-shaped hook end 30 and up the reach leg 34 until it is directly across from the access opening 40. The sister elements are then pivoted about the hollow rivet 42 to the closed position, as depicted in FIG. 3, and loop 54 of fish hook 52 is slid to the bight portion 32 of the u-shaped hook ends 30 (see FIG. 4) thereby engaging around the bight portion 32 of both sister elements 14 and preventing pivoting of the sister elements from the closed position. The position of fish hook 52 in FIG. 4 is also the in-use position for the fish hook. Loop 54 is always in the position where it prevents spreading of the sister elements from the closed position when the fish hook is being used, thereby precluding escape of the fish hook from the connector device 10 and accordingly from the end of the fishing line 16.

The device disclosed herein can be formed from any of a number of different suitable materials and by any of a number of different processes and, in its preferred form, the device is made of stainless steel. Three examples of the strength of a connector device constructed in accordance with the principles described herein are as follows: a sister hook arrangement measuring ½" in length, made of 1/32" thick stainless steel, and weighing 0.51 grams did not bend open until over 150 pounds of tensile stress had been applied thereto; a sister hook arrangement measuring 1" in length, made of 1/32" thick stainless steel, and weighing 2.21 grams did not bend open until more than 225 pounds of tensile stress had been applied thereto; and a sister hook arrangement measuring 1" in length, made of 3/32" thick stainless steel, and weighing 4.2 grams did not bend open until more than 525 pounds of tensile stress had been applied thereto. Accordingly, a quick release connector device of this diminutive size having this extraordinary strength is alone in the market place.

While this invention has been described with a certain degree if particularity, it should be understood that other forms of quick release connector devices for fish hooks are contemplated by the present invention and it is manifest that many changes may be made in the details of construction and in the arrangement of components without departing from the spirit and scope of the disclosure. It is understood that the invention is not limited to the embodiments set forth herein for purposes of exemplification, but is limited only by the scope of the attached claims, including the full range of equivalency to which each element is entitled.

I claim:

1. A device for facilitating the quick connection and disconnection of fish hook means to an end of a fishing line, said device comprising a sister hook arrangement including a pair of discrete sister elements wherein each of said discrete sister elements includes a first end and a second end, said first end of each sister element including an aperture and each said second end including a generally U-shaped hook having a bight portion, a connector leg connecting the bight portion to each respective first end, and a leg having a free end forming, with the respective first end, an access opening, means cooperating with said apertures for pivotally attaching said sister elements relative to one another, and extension means disposed on each of said sister elements for facilitating pivoting of said sister elements from a closed position wherein the sister elements are generally aligned with one another to an open position wherein unrestricted access to each respective access opening is permitted, whereby said fish hook means is engageable on a u-shaped hook of one of said sister elements when said sister elements of said sister hook arrangement are in the open position and positioning of the fish hook means generally in the u-shaped hook of both sister elements after said sister elements are pivoted to and aligned in the closed position precludes disengagement of the fish hook means from the device by preventing pivoting of the sister elements relative to one another.

2. A device as set forth in claim 1 wherein said device is connected to the end of the fishing line by a swivel means disposed between said sister hook arrangement and the end of said fishing line, said swivel means including means cooperating with said end of said fishing line for connecting the swivel to the fishing line and means for connection of the sister hook arrangement to the swivel means.

3. A device as set forth in claim 2 wherein said means for connection of the sister hook arrangement to the swivel means includes a length of elongated leader material.

4. A device as set forth in claim 3 wherein said leader material is looped through apertures in the first end of each of the sister elements and secured by means for securing and said leader material is looped through a portion of said swivel means and secured by means for securing.

5. A device as set forth in claim 4 wherein the means for securing the leader material in both instances is a ferrule and the sister elements are pivotally secured relative to one another by a hollow rivet received through the respective aligned apertures in the first end.

6. A device as set forth in claim 2 wherein said sister elements are generally mirror images of one another and said means for pivotally attaching said sister elements includes a hollow rivet received through said apertures.

7. A device as set forth in claim 5 wherein said leader material is multi-stranded coated wire.

8. A device as set forth in claim 5 wherein said leader material is braided.

9. A device as set forth in claim 5 wherein said leader material is a single strand of stainless steel wire.

10. A device as set forth in claim 1 wherein said sister hook arrangement is constructed of stainless steel, weighs less than 0.52 grams, and will withstand more than 150 pounds of tension before bending.

11. A device as set forth in claim 1 wherein said sister hook arrangement is constructed of stainless steel, weighs less than 2.25 grams, and will withstand more than 225 pounds of tension before bending.

12. A device as set forth in claim 1 wherein said extension means includes an extension aligned with said connector leg extending beyond said bight portion.

13. A device as set forth in claim 12 wherein the bight portion of each of said sister elements includes means for releasably maintaining said sister elements in alignment with one another when the sister elements of the sister hook arrangement are aligned and in the closed position.

14. A device as set forth in claim 13 wherein said means for releasably maintaining said sister elements in alignment includes a complementary detent in each bight portion.

15. A device as set forth in claim 1 wherein the bight portion of each of said sister elements includes means for releasably maintaining said sister elements in alignment with one another when the sister hook arrangement is in the closed position.

16. A method for releasable connection of a fish hook means to a free end of a fishing line comprising the steps of:

securing a connector device including a sister hook arrangement having a first discrete sister element and a second discrete sister element to a free end of a fishing line;

utilizing an extension on each respective sister element of said sister hook arrangement to facilitate opening of said sister hook arrangement;

opening the sister hook arrangement by pivoting the first discrete sister element out of alignment with the second discrete sister element;

engaging an attachment loop of the fish hook means on a u-shaped hook of one of said sister elements;

positioning the attachment loop of the fish hook means on said one sister element in alignment with an access opening of the other sister element; and closing the sister hook arrangement to thereby secure the fish hook means to the end of the fishing line.

17. A method for releasable connection of a fish hook means to a free end of a fishing line, as set forth in claim 16, including the step of:

shifting the attachment loop subsequent to the step of closing toward a bight portion of each generally u-shaped hook of each said sister element thereby engaging the attachment loop of the fish hook means over the generally u-shaped hook of both sister elements whereby opening of the sister hook arrangement is precluded and the fish hook means is prevented from escaping from the connector device.

* * * * *